United States Patent [19]
Deubler et al.

[11] Patent Number: 4,817,995
[45] Date of Patent: Apr. 4, 1989

[54] ROTATING UNION WITH REPLACEABLE SEALING ASSEMBLY

[75] Inventors: Louis H. Deubler, Northbrook; Delbert C. Reisener, Glenview; Dennis G. Pearson, Lake Zurich, all of Ill.

[73] Assignee: Deublin Company, Northbrook, Ill.

[21] Appl. No.: 11,839

[22] Filed: Feb. 6, 1987

[51] Int. Cl.⁴ .............................................. F16L 27/00
[52] U.S. Cl. ....................................... 285/98; 285/14; 285/93; 285/276; 285/375
[58] Field of Search ................... 285/276, 98, 375, 279, 285/14

[56] References Cited

U.S. PATENT DOCUMENTS

| | | | |
|---|---|---|---|
| 2,653,041 | 9/1953 | Wilson | 285/276 X |
| 2,723,136 | 11/1955 | Deubler | 285/276 X |
| 3,002,769 | 10/1961 | Deubler et al. | 285/276 X |
| 3,405,959 | 10/1968 | Walker | 285/276 |
| 3,889,983 | 6/1975 | Freize et al. | 285/276 X |
| 4,296,952 | 10/1981 | McCracken | 285/276 X |
| 4,632,431 | 12/1986 | McCracken | 285/276 X |

*Primary Examiner*—Thomas F. Callaghan
*Attorney, Agent, or Firm*—Emrich & Dithmar

[57] ABSTRACT

A rotating union including a seal assembly having a rotating seal member removably mounted in the rotor, a non-rotating floating seal member mounted in the housing of the union and keyed thereto to prevent rotation within the housing, and a bias assembly maintaining seal surfaces of the two seal members in engagement. In one embodiment, the combination of materials for the seal members provides a silicon carbide to carbon graphite seal.

11 Claims, 2 Drawing Sheets

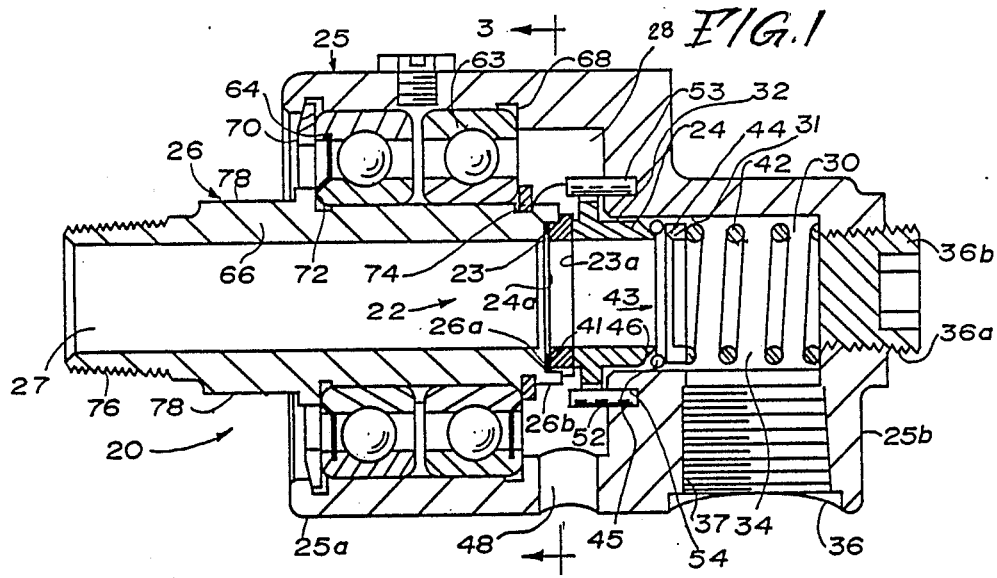
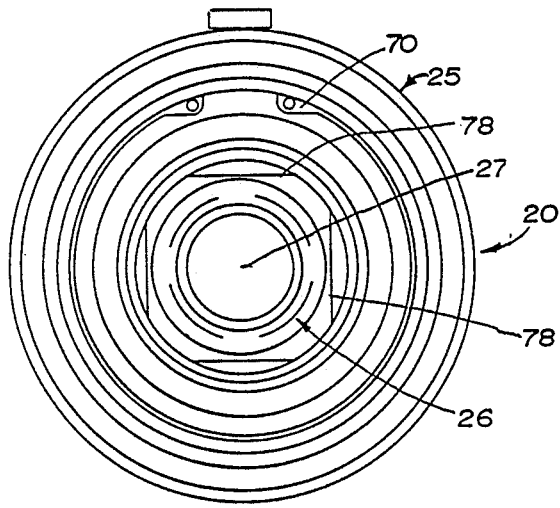
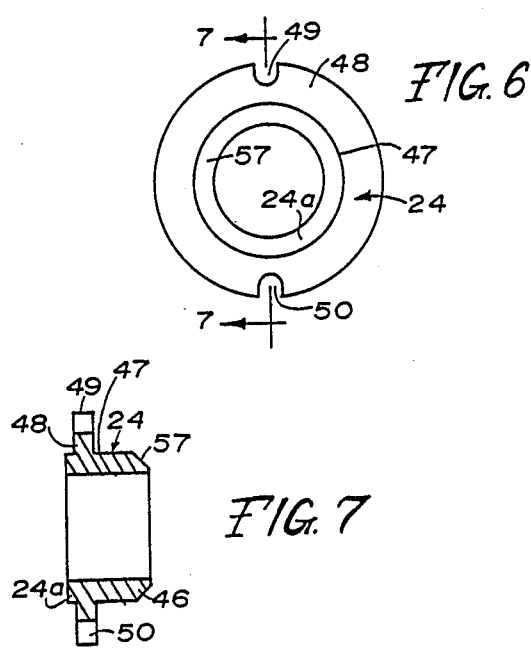
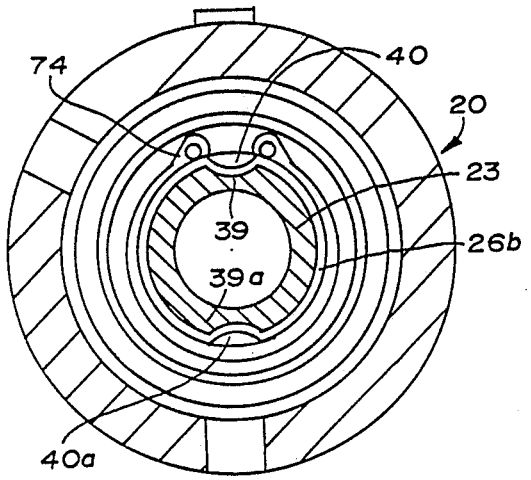
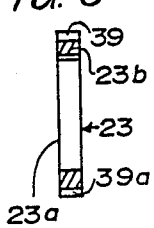
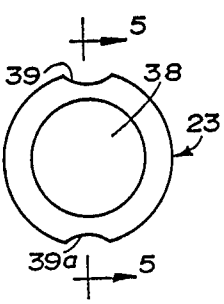

ROTATING UNION WITH REPLACEABLE SEALING ASSEMBLY

BACKGROUND OF THE INVENTION

This invention relates to rotating union type coupling devices, and more particularly to sealing assemblies for rotating unions.

Rotating unions are used in applications to couple the outlet of fluid sources to rotating devices. For example, rotating unions are used extensively in the printing industry, the paper processing industry, in high speed drilling and boring transfer operations, high speed machine tool spindles, clutch and brake operations etc.

The rotating unions are used to conduct fluids such as water, air, hydraulic fluid, coolant, steam, hot oil, depending upon application, from a source to a rotating device. A sealing assembly within the rotating union provides the interface between the fixed outlet of the fluid source and the rotating device. The rotor shaft mounts a first sealing member for rotation therewith. A second sealing member is non-rotatably mounted within the housing of the union. The non-rotating member is urged into fluid-tight engagement with the rotating seal face under the force of a bias means, typically a spring arrangement. Eventually, leakage may occur around the seal because of scoring of the face of at least the rotating seal member. Because the rotating seal member is either permanently attached to the rotor, or is integrally formed with the rotor, replacement of a damaged or scored rotating seal member requires replacement of the entire rotor assembly. This is a difficult and expensive operation and requires considerable amount of down time for the apparatus on which the rotating union is used. Thus, it would be desirable to have a rotating union which includes a seal assembly which is readily replaceable.

Another factor is the material from which the seal members are formed. At the present time, it is common practice to use carbon graphite to ceramic seal combination in rotating unions. Although such materials provide a good seal, the seal faces have a relatively short useable lifetime. It would be desirable to have a seal assembly formed of a material which exhibits increased wear resistance.

SUMMARY OF THE INVENTION

The present invention provides an improved seal assembly for rotating unions which is readily replaceable in the field and which includes seal members characterized by greater wear resistance than that for sealing members used in rotating unions presently available.

More specifically the present invention provides a seal means for a rotating union of the type including a stationary housing, a rotor rotatably mounted in the housing and having an inlet end and an outlet end projecting from one end of the housing for coupling to a rotating drive device adapted to receive fluid conducted through the rotating union, a discharge passageway extending axially through the rotor between its inlet and outlet ends, a fluid inlet chamber defined by a generally cylindrical inner wall portion of the stationary housing at the other end of the stationary housing, and inlet means communicating with the inlet chamber and adapted for connection to a source of fluid. The seal means provides a rotating seal between the inlet chamber of the housing and the discharge passageway of the rotor. The seal means comprises a rotating annular seal member removably mounted in a counterbore at the inlet end of the rotor to rotate with the rotor, a non-rotating seal means located in the inlet chamber and slidably supported therewithin, the non-rotating seal means including a seal member having an annular seal surface and bias means in the inlet chamber acting against the non-rotating seal member to maintain the seal surface of the non-rotating seal member resiliently engaged with the seal surface of the rotatable seal member. The seal means further includes means keying the counterbored inlet end of the rotor with the rotating seal member. The non-rotating seal means has a generally cylindrical portion extending axially of the inlet chamber of the housing and a peripheral mounting flange portion provided with first and second apertures aligned with first and second apertures formed in an interior surface of the housing, and key means inserted through the aligned apertures in the flange portion and in the housing to set the non-rotating seal means relative to the housing thereby preventing rotational movement of the non-rotating seal means within the housing.

The invention consists of certain novel features and structural details hereinafter fully described, illustrated in the accompanying drawings, and particularly pointed in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a side elevation view, in section, of a rotating union including a seal assembly provided by the present invention;

FIG. 2 is a rear elevation view of the rotating union;

FIG. 3 is a vertical sectional view taken along the line 3—3 of FIG. 1;

FIG. 4 is a plan view of the rotating seal element of the rotating union;

FIG. 5 is a sectional view taken along the line 5—5 of FIG. 4;

FIG. 6 is a front elevation view of the floating seal member of the rotating union;

FIG. 7 is a vertical sectional view taken along the line 7—7 of FIG. 6; and

DESCRIPTION OF THE PREFERRED EMBODIMENTS

Figure 8:
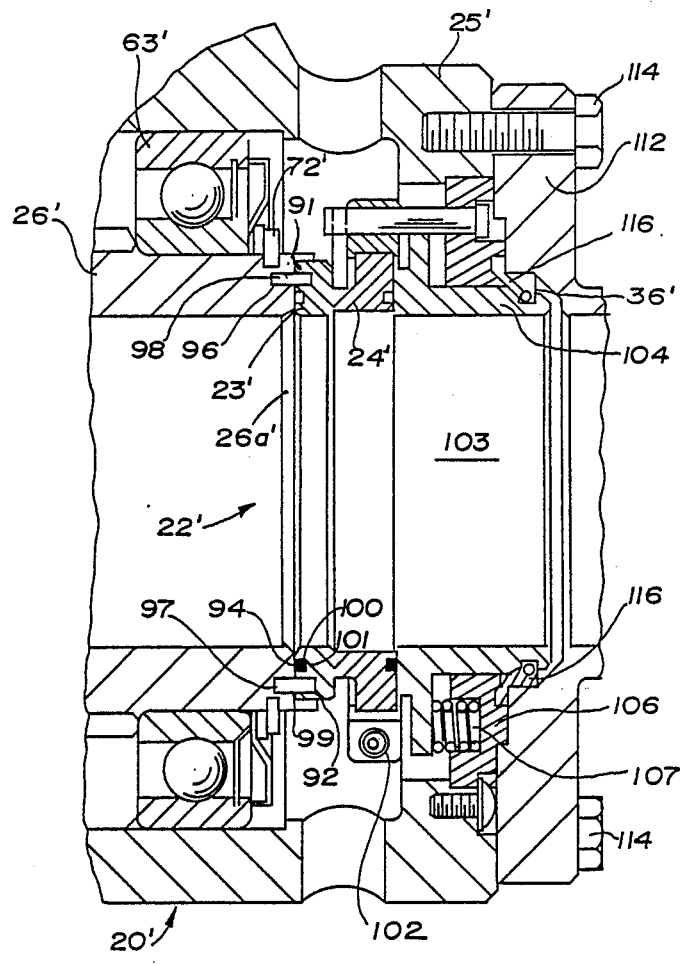
FIG. 8 is a fragmentary side elevation view, in section, of a rotating union including a further embodiment for a seal assembly provided by the present invention.

Referring to FIGS. 1-3, there is illustrated a rotating union 20 which incorporates the seal assembly 22 provided by the present invention. The seal assembly 22 includes a rotating seal member 23 (FIG. 4) and a non-rotating seal member 24 (FIG. 6). The rotating union 20 includes a stationary one-piece housing 25, formed of brass or other suitable material of the type having a non-corrosive nature. Rotatably mounted in enlarged axial bore 28 in the left hand end 25a of the housing 25 is a tubular rotor 26 composed for example of stainless steel and having an axial discharge passageway 27 therethrough. The rotor 26 is coupled to the driving element of the device (not shown) which is to receive a fluid, such as water, through the union 20. The rotor 26 is driven by the driving element to which it is coupled and is revolved at a rate determined by the driving element.

The opposite end 25b of the housing 25 and includes an inlet chamber 30 having a generally cylindrical bore or passageway 34 extending axially of the housing and defined by the inner wall 31 of the housing. The housing further defines a downwardly facing inlet 36, communicating with the inlet chamber 30 and which is internally threaded preferably with a pipe thread 37, for connection to a supply conduit connecting with the outlet of a fluid supply source (not shown) a further threaded inlet 36a is provided axially of the housing and normally closed with a plug 36b.

As previously indicated, the fluid supply source to which the inlet side of the rotating union is connected may be a source of fluid under pressure, such as compressed air, vapor, steam, water or other fluid which is intended to be emitted through the rotor 26 to the device with which the union is associated. Fluid conducted through the inlet 36 enters the axial bore 34 which defines the inlet chamber 30 for receiving the fluid, passes through axial bores in the seal members 23 and 24, and through the discharge bore 27 of the rotor to the rotating device connected to the rotor.

Referring to FIGS. 1 and 3, the rotating seal member 23 is removably mounted in a keyed counterbore in the end 26a of the rotor which defines a peripheral flange portion 26b. As shown best in FIGS. 4 and 5, the seal member 23 is a generally annular member provided with a central bore 38 of a diameter which corresponds to that of the seal member 24 and of the bore 27 of the rotor 26. A pair of arcuate concave notches 39 and 39a are provided along the periphery of the seal member 23 at diametrically opposed positions. Referring to FIGS. 1 and 3, the seal member 23 is mounted in the keyed counterbore in the end of the rotor 26. The keyed portion of the rotor is defined by inwardly extending arcuate shaped convex bend portions 40 and 40a (FIG. 3) provided in the flange portion 26b at diametrically opposed locations along the periphery of the rotor flange portion 26b. The curvature of the convex arcuate bend portions 40 and 40a is complementary to the curvature of the concave arcuate notches 39 and 39a in the seal member 23. As shown in FIG. 1, a gasket 41 is interposed between the rearward side 23a of the seal member 23 and the surface 26a of the rotor hub.

Referring to FIGS. 6 and 7, the non-rotating seal member 24 is a generally hollow cylindrical element having a peripheral mounting flange 48 projecting outwardly from the main body portion 47 near one peripheral edge. A pair of key slots 49 and 50 are defined at diametrically opposed positions along the peripheral flange and are aligned with apertures 51; 52 (FIG. 1) in the inner vertical surface of the housing forward of the inlet chamber 30. A pair of key pins 53 and 54 pass through the notches 49 and 50, respectively, and into the apertures 51 and 52, respectively, to prevent rotation of the seal member 24 within the housing 25.

The non-rotating seal member 24 is dimensioned and mounted within the inlet chamber 30 so as to be capable of forward sliding motion, as well as a limited tilting or angular floating motion within the inlet chamber. The shank portion of the non-rotating seal member 24 is spaced slightly from the inner surface 31 as indicated at 32, to permit the tilting or floating motion.

Confined in the inlet chamber 30 is a compression spring 42, the pressure of which is transmitted forwardly against the end of the non-rotating seal member 24 through a seal guide assembly 43 to the seal member 24, maintaining it in sealing engagement with the rotating seal member 23. The interfacing surfaces 23a and 24a of the seal members 23 and 24 are lap ground to define closely fitting seal surfaces. The seal guide assembly 43 includes an annular seal guide member 44 and a sealing ring 45 in the form of a VITON O-ring. Leakage forwardly through the space 32 is prevented by the O-ring 45 which seats on a bevelled forward edge 46 of the seal member 24 and is held in place by the seal guide member 44.

In accordance with one aspect of the invention, the seal members 23 and 24 are characterized by greater wear resistance than that afforded by known seal members for rotating unions. For example, in one embodiment, rotating seal valve member 23 is comprised of silicon carbide and non-rotating seal member 24 is composed of carbon graphite, it being understood that the relationship of materials may be reversed between the rotating and non-rotating seal members. It has been found that the combination of materials for the seal members 23 and 34 has wear resistance of up to ten times that of carbon graphite to ceramic seals. Other combinations of materials for other embodiments of the seal members 23 and 24 which exhibit increased wear resistance are silicon carbide to silicon carbide, and silicon carbide to tungsten carbide, and carbon graphite to tungsten carbide.

Referring to FIGS. 1 and 3, the housing 25 has three vent holes 48 formed through the side wall thereof in the region where the seal assembly 22 interfaces the rotor 26 with the housing 25. These vents enable fluid to be conducted to the outside of the housing when the seal provided by the sealing assembly 22 begins to wear. Such fluid leakage provides an indication of seal wear before the seal wear condition reaches the point as to allow fluid flow forward to ball bearings 63 and 64 which support the rotor 26 within the housing.

The stationary housing 25 is formed with a large axial bore 28 in which are seated inner and outer ball bearings 63 and 64 which are assembled with and surround the inner stem portion 66 of the rotor 26, thus affording an anti-friction bearing support for the rotor. The outer races of these two bearings are confined between an internal shoulder 68 of the housing 25 and a snap ring 70. The inner races of these bearings are confined between an internal shoulder 72 on rotor 26 and a snap ring 74 carried by the tubular stem 66 of the rotor. The projecting end of the rotor 26 is threaded, preferably with an external pipe thread 76 and is also provided with a wrench flats 78.

The seal assembly 22 including rotating seal member 23 and non-rotating seal member 24 is removably mounted within the housing 25, providing quick and easy replacement of both the non-rotating seal member 24 and the rotating seal member 23. To replace the rotating seal member 23, it is merely necessary to remove snap ring 70 which permits the assembly of the rotor and bearings to be slid out of the housing. The rotating seal member 23 simply lifts out and a new seal member can be dropped into place in the keyed counterbore provided at the end 26a of the rotor. The assembly of the rotor and bearings is then reassembled into the housing, and the snap rings replaced to complete the replacement operation.

For replacement of the non-rotating seal member 24, the assembly of the rotor and bearings is removed as described previously and the seal member 24 is removed through the discharge opening of the housing by sliding the seal member 24 forward (to the left). A new or a replacement seal member is then mounted within the housing with its notches 49 and 50 aligned with the key pins 51, 52 and the assembly of rotor and bearings is then replaced to complete the assembly.

Referring to FIG. 8, there is illustrated a further embodiment for a seal assembly 22' provided by the present invention. The rotating union 20' is shown in a fragmentary view in as much as the union 20' is generally similar to the rotating union 20 illustrated in FIG. 1. Accordingly, like elements have been given the same reference numeral but with a prime notation.

In the rotating union 20', the rotating seal member 23' is a generally annular shaped member with two apertures 91 and 92 on one surface 94 at diametrically opposed positions near the periphery thereof. The apertures 91 and 92 are aligned with corresponding apertures 96 and 97 formed in the end 26a' of the rotor 26'. Index pins 98 and 99 thread respective aperture pairs 91,96 and 92,97 to key the seal member 23' to the rotor 26'. The surface 94 of the seal member 23' is provided with an annular groove 100, inwardly of apertures 91,92, which receives a sealing O-ring 101 to provide a fluid tight seal between the peripheral edge of the seal member 23' and the rotor 26'.

Referring to the non-rotating seal member 24' in this embodiment, the floating seal is an assembly including a non-rotating seal member 24', a retaining ring 102 and a retaining assembly 103. The non-rotating seal member 24' is a generally annular shaped member which is mounted within the retaining ring 102 which may be of steel or similar material. The retaining assembly 103 includes a retaining sleeve 104 mounted within the inlet chamber 36' and urged against the seal member 24' by a retaining plate 106 which carries a plurality of coil springs, such as coil spring 107 shown in FIG. 8. By way of example, three such springs 107 may be provided equi-distant along the periphery of the annular retaining plate 106. The seal retaining sleeve 104 is connected to the retaining plate 106 through a plurality of garter springs 116.

The fluid inlet end of the housing 25' of the rotating union 20' is enclosed by an end cap 112 which is removably attached to the housing 25' as by machine bolts 114.

In this embodiment, replacement of the non-rotating seal member 24' is accomplished by removing the bolts 114 and thereby enabling the end cap 112 to be removed from the housing 25'. The retaining assembly 103, including the floating seal retaining sleeve 104 and the retaining plate 106 can then be slid out of the housing 25', permitting removal of the seal member 24' and rotating seal member 23'.

We claim:

1. In a rotating union including a relatively stationary housing, a rotor assembly rotatably mounted in the housing and having an inlet end and an outlet end projecting from one end of the housing for coupling to a rotating drive device adapted to receive fluid conducted through the rotating union, a discharge passageway extending axially through the rotor between its inlet and outlet ends, a fluid inlet chamber defined by a generally cylindrical inner wall portion of the stationary housing at the other end of the stationary housing, inlet means communicating with said inlet chamber and adapted for connection to a source of fluid, and seal means providing a rotating seal between said inlet chamber of the housing and the discharge passageway of the rotor, said seal means comprising:

a rotating annular seal member removably mounted in a counterbore at the inlet end of the rotor to rotate with the rotor, said annular seal member having a pair of concave notches on the periphery thereof and including an annular seal surface, a one piece non-rotating seal means located in the inlet chamber and slidably and removably supported therewithin, said one-piece non-rotating seal means including a seal member portion having an annular seal surface, bias means positioned in the inlet chamber acting against said non-rotating seal means to maintain said annular seal surface of said non-rotating seal member resiliently engaged with said annular seal surface of said rotating seal member, means keying the counterbored inlet end of the rotor with said rotating seal member, said means keying comprised of a pair of convex bend portions which are complementary to said pair of concave notches on the periphery of said annular seal member, said one-piece non-rotating seal means having a generally cylindrical portion extending axially of the inlet chamber of the housing and a peripheral mounting flange portion provided with first and second apertures aligned with first and second apertures formed in an interior surface of the housing, and key means inserted through the aligned apertures in said flange portion and in the housing to set the non-rotating seal means relative to the housing thereby preventing rotational movement of said non-rotating one-piece seal means within the housing.

2. A rotating union according to claim 1, wherein one of said rotating annular seal member and said one-piece non-rotating seal member is composed of silicon carbide and the other one of said rotating annular seal member and said one-piece non-rotating seal member is composed of carbon graphite.

3. A rotating union according to claim 1, wherein one of said rotating annular seal member and said one-piece non-rotating seal member is composed of silicon carbide and the other one of said rotating annular seal member and said one-piece non-rotating seal member is composed of tungsten carbide.

4. A rotating union according to claim 1, wherein said rotating seal member and said non-rotating seal member are composed of silicon carbide.

5. A rotating union according to claim 1, wherein said bias means comprises spring means and an annular seal guide member located in the inlet chamber of the housing for distributing a bias force provided by said spring means to a peripheral edge of said non-rotating seal member.

6. A rotating union according to claim 5, wherein said non-rotating seal means further comprises an O-ring disposed around said peripheral edge of said non-rotating seal member with said annular seal guide member interposed between said spring means and said O-ring for distributing the force of said spring means through the O-ring to said peripheral edge of said one-piece non-rotating seal member.

7. In a rotating union including a relatively stationary housing, a rotor assembly rotatably mounted in the housing and having an inlet end and an outlet end projecting from one end of the housing for coupling to a rotating drive device adapted to receive fluid conducted through the rotating union, a discharge passageway extending axially through between its inlet and outlet ends, a fluid inlet chamber defined by a generally cylindrical inner wall portion of the stationary housing at the other end of the stationary housing, inlet means communication with said inlet chamber and adapted for connection to a source of fluid, and sealing means for providing a rotating seal between said inlet chamber of the housing and the discharge passageway of the rotor, said seal means comprising:

an annular rotating seal member removably mounted in a counterbore at the inlet end of the rotor to rotate with the rotor, said rotating seal member having an annular seal surface thereon, a generally cylindrical one-piece non-rotating seal member mounted in the inlet chamber and slidably and removably supported therewithin, and said one-piece non-rotating seal member having an annular seal surface opposing said annular seal surface of said annular rotating seal member, bias means positioned in the inlet chamber acting against said non-rotating sealing member to urge said annular seal surface of said non-rotating sealing member into engagement with said seal surface of said rotating seal member, means keying the counterbored inlet end of the rotor with said rotating seal member, said means keying comprised of a pair of convex bend portions mounted on the counterbored inlet end of said rotor which are complementary to a pair of concave notches positioned on the periphery of said annular rotating seal member to rotate the same, said one-piece non-rotating seal member having a peripheral mounting flange portion provided with at least first and second apertures aligned with first and second apertures formed in an interior surface of the housing and key means inserted through the aligned apertures in said flange portion and in the housing to set the non-rotating member relative to the housing thereby preventing rotational movement of said non-rotating seal member within the housing.

8. A rotating union according to claim 7, wherein one of said rotating seal member and non-rotating seal member is made of silicon carbide and the other one of said rotating seal member and non-rotating seal member is made of carbon graphite.

9. A rotating union according to claim 7, wherein one of said rotating seal member and non-rotating seal member is made of silicon carbide and the other one of said rotating seal member and non-rotating seal member is made of tungsten carbide.

10. A rotating union according to claim 7, wherein said rotating sealing member and said non-rotating sealing member are made of silicon carbide.

11. A rotating union according to claim 7, wherein bias means comprises a coil spring contained within said inlet chamber and extending axially thereof, said non-rotating seal assembly further comprising an O-ring disposed around a peripheral inlet edge of said non-rotating seal member and an annular seal guide member interposed between said coil spring and said O-ring for distributing the force of said coil spring through said O-ring to the inlet edge of said non-rotating seal member.

* * * * *

UNITED STATES PATENT AND TRADEMARK OFFICE
CERTIFICATE OF CORRECTION

PATENT NO. : 4,817,995

DATED : April 4, 1989

INVENTOR(S) : Louis H. Deubler, Delbert C. Reisener and Dennis G. Pearson

It is certified that error appears in the above—identified patent and that said Letters Patent is hereby corrected as shown below:

Column 7, line 11, change "communication" to --communicating--.

Signed and Sealed this

Second Day of January, 1990

*Attest:*

JEFFREY M. SAMUELS

*Attesting Officer*   *Acting Commissioner of Patents and Trademarks*